Feb. 17, 1959
J. H. STAAK
2,874,309
COMBINATION STARTER MOTOR AND MAGNETO
FOR INTERNAL COMBUSTION ENGINES
Filed Sept. 12, 1957
3 Sheets-Sheet 1
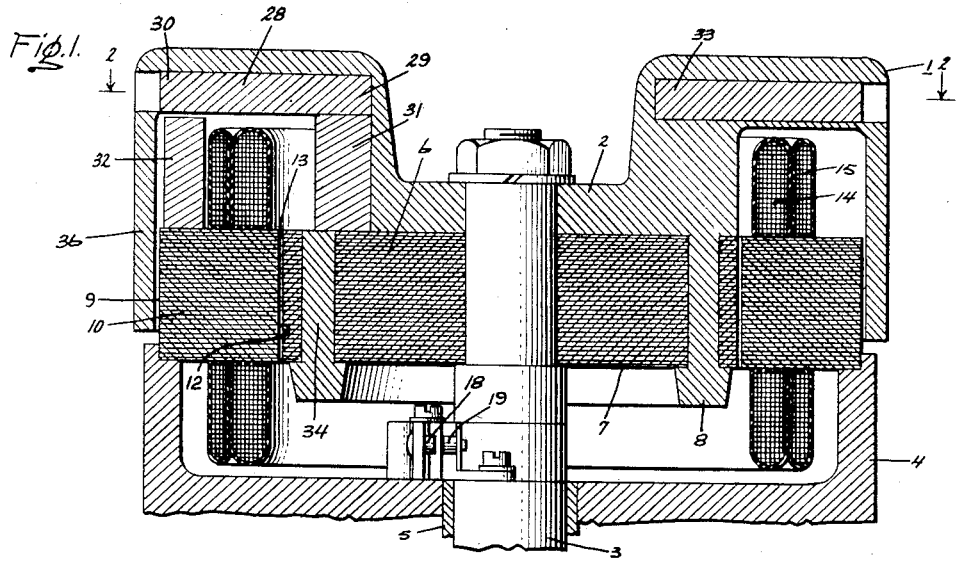
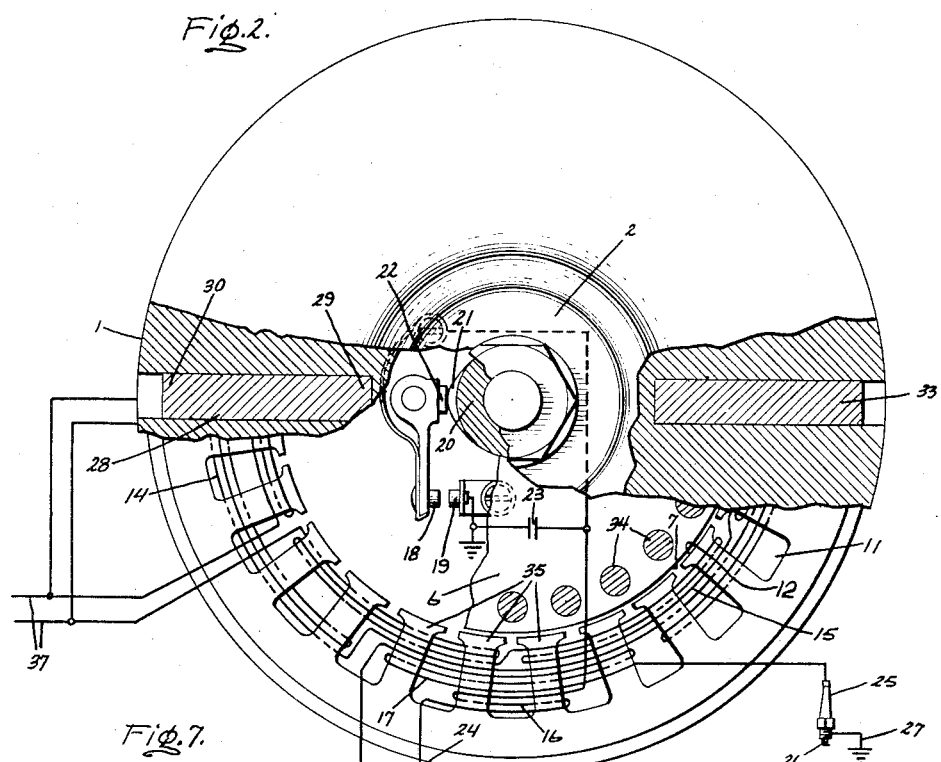
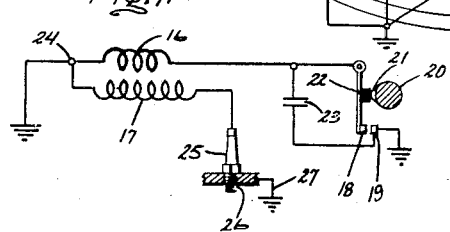
Inventor:
Julius H. Staak,
by
Attorney.

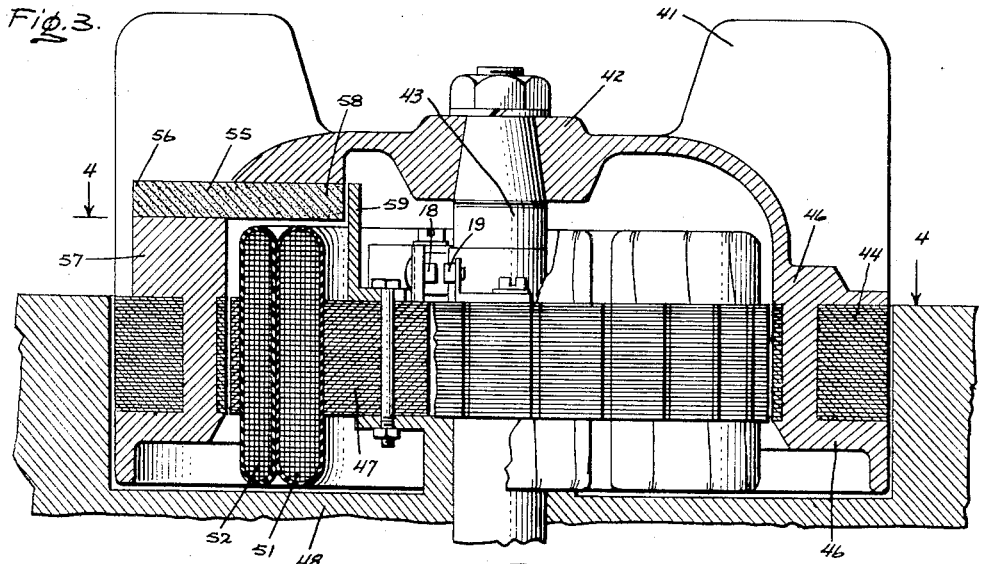
Feb. 17, 1959     J. H. STAAK     2,874,309
COMBINATION STARTER MOTOR AND MAGNETO
FOR INTERNAL COMBUSTION ENGINES
Filed Sept. 12, 1957     3 Sheets-Sheet 2
Inventor:
Julius H. Staak,
by [signature]
Attorney.

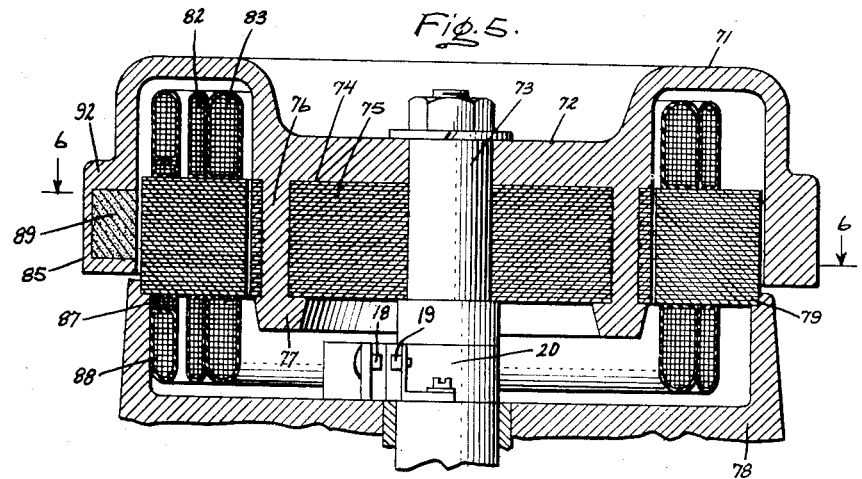
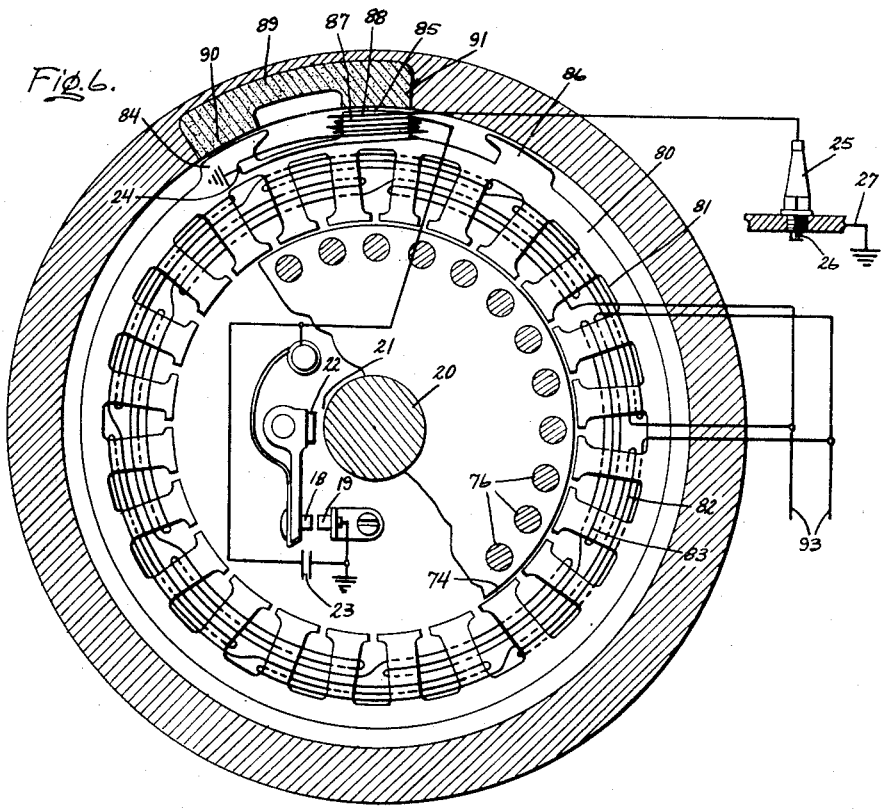

United States Patent Office 2,874,309
Patented Feb. 17, 1959

2,874,309

COMBINATION STARTER MOTOR AND MAGNETO FOR INTERNAL COMBUSTION ENGINES

Julius H. Staak, Fort Wayne, Ind., assignor to General Electric Company, a corporation of New York Application September 12, 1957, Serial No. 683,597

7 Claims. (Cl. 290—38)

This invention relates to electric starting and operating equipment for internal combustion engines, and more particularly to a novel combination of an electric starter motor and a magneto for such engines.

Internal combustion engines of the electric ignition type require electric apparatus for two different phases of their operation: first, a starting motor is generally required to initiate operation; and second, a magneto must be provided to furnish the spark which causes the ignition of the combustible fluid within the cylinders of the engine during operation. Both of these electrical devices require the use of a core of magnetic material with conductors arranged on the core so that current through the conductors has a direct effect on the magnetic flux in the core, and vice versa. Since the same general type of phenomenon (magnetic flux creates a current in a conductor and vice versa) is present in both electrical devices, it is proposed to improve the utilization of the component parts of the internal combustion engine by providing a magnetic core which will cooperate with both the motor windings and the magneto windings to effect the two desired purposes. This is of particular importance where space and weight are at a premium as, for example, in the field of internal combustion engine lawn mowers. An additional important consideration in this field is the provision of a suitable flywheel. It is proposed in the present invention to combine the engine flywheel with the electrical components so that the three form a compact package where each device not only performs its function without impairment, but also cooperates with the others to permit utilization of a far smaller amount of space than has heretofore been believed possible.

It is, therefore, an object of this invention to provide improved electric starting and ignition devices for use with an internal combustion engine where the two devices utilize the same magnetic core member.

A further object of the invention is to provide a magneto and a starting motor for an internal combustion engine in combination with a flywheel where the three devices cooperate with each other to permit utilization of a minimum of space without impairment of the operation of the devices.

A further object of the invention is to achieve the space saving effect by providing the flywheel and the motor coaxially and by providing a single magnetic core in connection with both the magneto and the motor.

In one aspect thereof, the invention provides, for use in an electric ignition internal combustion engine, a flywheel which is adapted to be directly connected to the engine in the usual manner. A self-starting electric motor has both its rotor member and its stator member positioned coaxially with the flywheel, the rotor member being secured to the flywheel so as to rotate therewith while the stator member is secured immovably relative to the flywheel. The stator member has a slotted magnetic core with motor windings positioned in the slots thereof in the usual manner so as to cause rotation of the rotor member upon energization of the windings. In addition to the motor windings, magneto primary and secondary windings are arranged on a portion of the core. Flux creating means are supported on the flywheel, which is in cooperative relation with the core so as to provide a complete magnetic circuit which includes the core portion. In combination with this construction, timing means are provided to close the circuit of the primary winding substantially at the time the complete magnetic circuit is provided; the secondary winding is adapted to be connected across a suitable spark producing device so as to provide a spark when the primary winding circuit is closed or opened to cause a sudden change in the current through its primary winding.

With this construction, the magnetic core provided for the motor windings also serves as the core for the magneto which has its primary and secondary windings arranged thereon. A further result of the construction is that the motor, magneto, and flywheel are brought into an intimate relationship which greatly economizes the amount of space required by the three without affecting their operation.

The features of the invention which are believed to be novel are set forth with particularity in the appended claims. The invention, itself, however, both as to its organization and method of operation, together with further objects and advantages thereof, may best be understood by reference to the following description taken in connection with the accompanying drawings.

In the drawings, Figure 1 is a cross sectional side view illustrating the invention;

Figure 2 is a view along line 2—2 in Figure 1, with the windings of the motor and of the magneto being shown schematically for the sake of clarity;

Figure 3 is a cross sectional side view of a second embodiment of the invention;

Figure 4 is a view along line 4—4 in Figure 3, with the motor and magneto windings shown schematically for the sake of clarity;

Figure 5 is a side view in cross section showing yet another embodiment of the invention;

Figure 6 is a view along line 6—6 in Figure 5, with the motor and magneto windings shown schematically for the sake of clarity; and Figure 7 is a schematic representation of the standard magneto circuit provided in the invention.

Referring now to Figures 1 and 2 of the drawings, there is shown a flywheel member 1 having a hub 2 mounted on a rotatable shaft 3 so as to be rigidly secured thereto. Shaft 3 is directly secured to an internal combustion engine of the electric ignition type (not shown) which is provided with a casing, part of which appears in Figure 1 as shown at 4. The casing 4 may include a suitable bearing member 5 within which the shaft 3 may be rotatably mounted. Also secured to shaft 3 coaxially with flywheel 1 is the rotor member 6 of an electric self-starting motor such as the induction motor illustrated. Rotor 6 includes a magnetic core member 7 normally made up of a stacked plurality of thin laminations of magnetic material, together with conductors 34 extending therethrough which are short circuited together at their ends by end rings 8 so as to form a squirrel cage winding in the usual manner. A stator member 9 is secured to the engine casing 4, and is mounted in concentric relation with the rotor 6 and in rotatable relation thereto so that the stator may remain stationary as the rotor and flywheel rotate. Flywheel 1 preferably has a portion 36 extending around stator 9.

Stator 9 includes a core member 10 which is made up in the usual manner from a stacked plurality of thin laminations of magnetic material, and is provided with slots 11 opening into bore 12, which forms an annular air gap 13 with the outside surface of rotor member 6. A main winding 14 and a starting winding 15 are arranged in slots 11 in the usual manner so as to be in cooperative relationship with rotor 6 to cause rotation thereof when the windings are energized from an appropriate source of power (alternating current in the illustrated case of an induction motor) through lines 37. The particular design of the windings 14 and 15 is not explained herein since it does not form a part of the invention and since self-starting electric motors are well known.

It will be observed, however, that both windings 14 and 15 are arranged in this case as part of a six pole motor winding. In the embodiment of Figures 1 and 2, one of the main winding poles has been omitted and in its place magneto primary winding 16 and secondary winding 17 have been wound around the teeth 35 which would normally have received the last pole of the main winding. Primary winding 16 normally is made up of a few turns of relatively heavy wire while the secondary winding 17 is made up of a great many turns (generally several thousand) of very fine wire.

As best shown in Figure 7, the completion of the circuit of primary winding 16 from ground to ground is controlled in the usual manner for magnetos by a pair of contacts 18 and 19. Contact 18 is controlled by a timing cam 20 so that over most of a revolution of the flywheel 1 the contacts are apart but when cam rise 21 comes into contact with insulating follower 22, the contacts are closed to complete the primary winding circuit. Also, as is conventional in magneto circuits, a capacitor 23 may be provided across the contacts. One end of the secondary winding 17 is connected to one end of the primary winding 16, as shown at 24, and is thus connected to ground. The other end of the secondary winding is connected through a spark plug device 25 which includes a spark gap 26 to a line 27 and then to ground to complete the circuit, as shown. Thus, the secondary circuit must be completed through spark gap 26.

Flux creating means are provided secured to the flywheel. This is effected preferably by permanent magnet 28 embedded in flywheel 1 as shown; magnet 28 is arranged so that one of its poles is at its innermost end and the other is at its outermost end. For smooth operation, a counterweight 33 may be provided embedded in flywheel 1 opposite the magnet, as shown. The innermost end 29 of the magnet is in contact with a magnetic shunt 31 whose other end engages the magnetic core 7 of rotor 6. A second magnetic shunt 32 is provided with one end in engagement with and secured to core 10 of stator 9, and with its other end closely adjacent to end 30 of magnet 28, being separated therefrom only by a parasite gap sufficiently large to permit unimpaired rotation of the flywheel 1. A magnetic circuit is thus completed through the magnet 28, shunt 31, rotor core member 7, stator core member 10, and shunt 32. It will further be observed that the plane in which this path is provided is substantially at right angles to the plane of the flux which links the rotor and stator for motor operation and which, as can be seen in Figure 2, extends down through the teeth on which one pole of a stator winding is provided, through the rotor, and back up through the teeth on which the adjacent pole is provided. This separation of flux paths precludes harmful effects to magnet 28 from the energizing source (alternating current in the case of induction motors) of the motor.

The timing mechanism 21 is so arranged that it closes its contacts 18 and 19 at approximately the time that the flywheel 1 is in such a position relative to stator 9 that the flux path which includes the permanent magnet passes through the stator teeth on which the transformer coils are wound. This sudden closing of the circuit then provides an impulse voltage through the primary winding which is greatly magnified through the secondary winding and causes a spark to jump across gap 26. Of course, the impulse could be equally well obtained by a sudden opening of the primary winding circuit, the rate of change of flux being the important factor.

Thus, the structure described provides an arrangement where the same magnetic stator core member and rotor core member used for motor operation are also put to use in effecting the necessary magneto action which is required in electric ignition internal combustion engines. In addition, the arrangement of the flywheel, so that it carries part of the magneto equipment and is coaxial with the motor parts, provides an exceedingly compact arrangement where the three devices cooperate with each other to provide the necessary effects without any impairment of function except to the minor extent that the omission in the motor of one of the main winding poles will cause the creation of a consequent pole instead at that location and at that extent will modify the operation. However, as will be shown in the modifications to be discussed below, complete omission of one pole-winding of the motor is not required for the success of the invention; in fact, if the slots and yoke of the motor stator are made sufficiently deep, the motor windings need not be changed in any way to permit the provision of the magneto windings.

Referring now to Figures 3 and 4 of the drawings, a second embodiment of the invention will be described. In this case, as before, a flywheel 41 is provided with a hub 42 secured to a shaft 43. The core member 44 of a motor rotor is secured to the flywheel so as to rotate therewith; conductors 45 extend through slots provided in core 44 and are short circuited together at each end by end ring members 46. The stator member 47 in this case is concentrically within the rotor member and is again secured to the engine casing 48 as shown. The stator core 49 has slots 50 within which are positioned main winding 51 and start winding 52 energized through lines 60. Also positioned at a predetermined location on the stator around a predetermined number of teeth are the magneto primary winding 53, made up as before of a small number of turns of large wire, and the magneto secondary winding 54, also made up as before of a large number of turns of very fine wire. Permanent magnet 55 has its outer end 56 in contact with a shunt 57 which is also in contact with the core 44 of the rotor; the inner end 58 of the magnet is separated only by a parasite gap from the end of a shunt 59 which is secured to stator core 49 as shown. It will readily be apparent that a magnetic circuit similar to that of the embodiment of Figures 1 and 2 is completed which includes the exciting permanent magnet 55 and then passes through shunt 57, rotor core 44, stator core 49 and shunt 59 back to the magnet. It will also be observed that, as before, this magnetic path is at right angles to the magnetic path which links the stator to the rotor and causes operation of the motor.

The magneto primary and secondary winding circuits are identical to those of Figures 1 and 2 as shown in Figure 7. It will thus be seen that the effect is substantially the same as that set forth in the case of Figure 1, with a high voltage impulse causing a spark across gap 26 as windings 53 and 54 are encircled by the exciting field created by magnet 55. The fact that the rotor member is outside the stator member in this case aids the flywheel action, as opposed to the more standard and conventional motor structure where the motor is inside the stator as shown in Figures 1 and 2. Also, it will be seen that in this second embodiment the magneto windings were provided in addition to the motor windings, that is, no motor winding was removed. It will readily be understood that these two concepts represent extreme limits and that design requirements may result in a compromise where the motor winding poles are merely modified rather than partially eliminated.

Referring now to Figures 5 and 6, a third embodiment of the invention will be described. As before, a flywheel 71 having a hub 72 secured to shaft 73 has secured to it a rotor member 74 which includes a magnetic core 75, conductors 76 and short circuiting end rings 77. Secured to the casing 78 of an internal combustion engine (not shown) is a stator 79 having a core portion 80 with slots 81 formed therein. Suitable windings 82 and 83 energized through lines 93 are provided in order to effect a self-starting motor as is well known in the art. Portion 92 of the flywheel extends around stator 79, as shown.

In this embodiment, core member 80 is formed with three outwardly extending projections 84, 85 and 86, with magneto primary winding 87 and secondary winding 88 wound on projection 85. A permanent magnet 89 is embedded in portion 92 of flywheel 71. Magnet 89 is substantially U-shaped, with its poles provided at the ends of the legs 90 and 91 of the U so that they extend toward the projections on the stator core. With this arrangement, when the flywheel has rotated to a predetermined position, as shown in Figure 6, the poles 90 and 91 are aligned with the center projection 85 on which magneto windings 87 and 88 are provided and with one of the other two projections 84 and 86 so that a magnetic circuit is completed starting with the exciting magnet 89 and then passing through projection 84 back to projection 85 and across the gap to pole 91 of the magnet.

As before, a magneto circuit is connected with windings 87 and 88 as set forth in Figure 7. With this embodiment, as before, the same core member serves for both the magneto and the motor with the magnetic circuits being provided so that there is no interference between the two. In this last case, however, the core structure is modified from that of a simple motor core in order to permit the elimination of the magnetic shunts required in the previous embodiments. The construction of Figures 5 and 6 also eliminates any design problem insofar as fitting the magneto windings and the motor windings into the same slots in an economical and effective manner is concerned.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. For use in an electric ignition internal combustion engine, a flywheel constructed and arranged to be directly connected to the engine, a self-starting electric motor having a rotor member and a stator member positioned coaxially with said flywheel, said rotor member being secured to said flywheel to rotate therewith, said stator member being secured immovably relative to said flywheel, said stator member having a slotted magnetic core with motor windings positioned in said slots, said core further having magneto primary and secondary windings arranged on a portion thereof, flux creating means supported on said flywheel, said flywheel and said core being formed to provide a complete magnetic circuit including said core portion at a predetermined position in the rotation of said flywheel, and timing means arranged to cause a sudden change of current through said primary winding substantially at the time said complete magnetic circuit is provided, said secondary winding including electrical lead means for connection across a spark creating device to energize said device to produce a spark in response to a high impulse voltage generated across said secondary winding.

2. For use in an electric ignition internal combustion engine, a flywheel constructed and arranged to be directly connected to the engine, a self starting induction-type electric motor having a rotor member and a stator member positioned coaxially with said flywheel, said rotor member being secured to said flywheel to rotate therewith, said stator member being secured immovably relative to said flywheel, said stator member having a slotted magnetic core with motor windings positioned in said slots, said core further having magneto primary and secondary windings arranged on a portion thereof, permanent magnet flux-creating means supported on said flywheel, said permanent magnet said flywheel and said core being formed to provide a complete magnetic circuit including said core portion at a predetermined position in the rotation of said flywheel, and timing means arranged to cause a sudden change of current through said primary winding substantially at the time said complete magnetic circuit is provided, said secondary winding including electrical lead means for connection across a spark creating device to energize said device to produce a spark in response to a high impulse voltage generated across said secondary winding.

3. For use in an electric ignition internal combustion engine, a flywheel constructed and arranged to be directly connected to the engine, a self-starting induction-type electric motor having a rotor member and a stator member positioned coaxially with said flywheel, said rotor member being secured to said flywheel to rotate therewith, said stator member being secured immovably relative to said flywheel, said stator member having a slotted magnetic core with motor windings positioned in said slots, said core further having magneto primary and secondary windings arranged on a portion thereof, permanent magnet flux creating means supported on said flywheel, said magnet said flywheel and said core being formed to provide a complete magnetic circuit including said core portion at a predetermined position in the rotation of said flywheel, said magnetic circuit including said magnet being substantially removed from the magnetic circuit created during motor operation whereby the alternating flux of the motor operation does not pass through said magnet, and timing means arranged to cause a sudden change of current through said primary winding substantially at the time said complete magnetic circuit is provided, said secondary winding including electrical lead means for connection across a spark creating device to energize said device to produce a spark in response to a high impulse voltage generated across said secondary winding.

4. For use in an electric ignition internal combustion engine, a flywheel constructed and arranged to be directly connected to the engine, a self-starting motor having a rotor member and a stator member positioned coaxially with said flywheel, said rotor member being positioned within said stator member, said flywheel having a portion extending around said stator member, said rotor member being secured to said flywheel to rotate therewith, said stator member being secured immovably relative to said flywheel, said stator member having an internally slotted magnetic core with motor windings positioned in said slots, said core further having magneto primary and secondary windings arranged in the slots of a portion thereof, permanent magnet flux creating means supported on said flywheel, said magnet said flywheel and said core being formed to provide a complete magnetic circuit including said core portion at a predetermined position in the rotation of said flywheel, and timing means arranged to cause a sudden change of current through said primary winding substantially at the time said magnetic circuit is provided, said secondary winding including electrical lead means for connection across a spark creating device to energize said device to produce a spark in response to a high impulse voltage generated across said secondary winding.

5. For use in an electric ignition internal combustion engine, a flywheel constructed and arranged to be directly connected to the engine, a self-starting electric motor having a rotor member and a stator member positioned coaxially with said flywheel, said rotor member being positioned within said stator member and being secured to said flywheel to rotate therewith, said stator member being secured immovably relative to said flywheel, said flywheel having a portion extending around said stator member, said stator member having an internally slotted magnetic core with motor windings positioned in said slots, said core further having a radially outwardly projecting portion, magneto primary and secondary windings arranged on said outwardly projecting portion, permanent magnet flux creating means supported on the portion of said flywheel which extends about said stator member, said permanent magnet and said core being formed to provide a complete magnetic circuit including said outwardly projecting portion of said core at a predetermined position in the rotation of said flywheel, and timing means arranged to cause a sudden change of current through said primary winding substantially at the time said complete magnetic circuit is provided, said secondary winding including electrical lead means for connection across a spark creating device to energize said device to produce a spark in response to a high impulse voltage generated across said secondary winding.

6. For use in an electric ignition internal combustion engine, a flywheel constructed and arranged to be directly connected to the engine, a self-starting electric motor having a rotor member and a stator member positioned coaxially with said flywheel, said rotor member being positioned within said stator member and being secured to said flywheel to rotate therewith, said stator member being secured immovably relative to said flywheel, said flywheel having a portion extending around said stator member, said stator member having an internally slotted magnetic core with motor windings positioned in said slots, said core further having magneto primary and secondary windings arranged in some of said slots about a portion of said core, permanent magnet flux creating means supported on said flywheel, magnetic shunt means completing a magnetic circuit including said permanent magnet and said stator core portion, at a predetermined position in the rotation of said flywheel, and timing means arranged to cause a sudden change of current through said primary winding substantially at the time said magnetic circuit is provided, said secondary winding including electrical lead means for connection across a spark creating device to energize said device to produce a spark in response to a high impulse voltage generated across said secondary winding.

7. For use in an electric ignition internal combustion engine, a flywheel constructed and arranged to be directly connected to the engine, a self starting electric motor having a rotor member and a stator member positioned coaxially with said flywheel, said rotor member being positioned about said stator member and being secured to said flywheel to rotate therewith, said stator member being secured immovably relative to said flywheel and having an outwardly slotted magnetic core with motor windings positioned in said slots, said stator core further having magneto primary and secondary windings arranged in some of said slots about a portion of said stator core, permanent magnet flux creating means supported on said flywheel, magnetic shunt means completing a magnetic circuit including said permanent magnet and said stator core portion at a predetermined position in the rotation of said flywheel, and timing means arranged to cause a sudden change of current through said primary winding substantially at the time a complete magnetic circuit is provided, said secondary winding including electrical lead means for connection across a spark creating device to energize said device to produce a spark in response to a high impulse voltage generated across said secondary winding.

No references cited.